United States Patent [19]

Westmoreland

[11] 3,834,220

[45] Sept. 10, 1974

[54] BUBBLE TEST FOR INTERNAL COMBUSTION ENGINES

[76] Inventor: Hollis O. Westmoreland, 12010 Arcola, Livonia, Mich. 48150

[22] Filed: Dec. 11, 1972

[21] Appl. No.: 313,853

[52] U.S. Cl. .................................. 73/47, 73/49.7
[51] Int. Cl. ............................................ G01m 3/06
[58] Field of Search ............ 73/47, 46, 49.7, 37, 40, 73/40.7, 45.6

[56] References Cited
UNITED STATES PATENTS

| | | | |
|---|---|---|---|
| 2,003,949 | 6/1935 | Morgan et al. | 73/47 X |
| 2,290,975 | 7/1942 | Laursen | 73/45.6 |
| 2,415,108 | 2/1947 | Newman | 73/40 |
| 2,528,563 | 11/1950 | Testut et al. | 73/40 |
| 3,266,297 | 8/1966 | Powers | 73/49.7 |

*Primary Examiner*—Jerry W. Myracle
*Assistant Examiner*—Joseph W. Roskos
*Attorney, Agent, or Firm*—Charles W. Chandler

[57] ABSTRACT

A procedure for locating piston and connecting rod defects in a piston operated, internal combustion engine such as a diesel engine. For two steps, the engine is supported upside down and diesel fuel or similar liquid disposed inside each piston being tested. The crankshaft is then turned over to compress the air in each combustion chamber. Air bubbling through the liquid in any piston indicates a defect, such as a sand hole, in the piston. To locate a blocked oil passage in the connecting rods, compressed air is passed through the oil gallery to form bubbles in the liquid contained in the pistons. The absence of bubbles in any piston indicates a blocked passage in the corresponding connecting rod or a blocked passage leading to the connecting rod.

In another form of the test, the engine is tested right side up. An opening is formed in the top of the combustion chamber by removing the fuel injector or fuel nozzle or plug, and the chamber is then filled with oil. By applying air pressure to the bottom of the piston, the user can detect a defective piston by observing bubbles passing up through the combustion chamber in the fuel injector opening.

5 Claims, 3 Drawing Figures

PATENTED SEP 10 1974
3,834,220
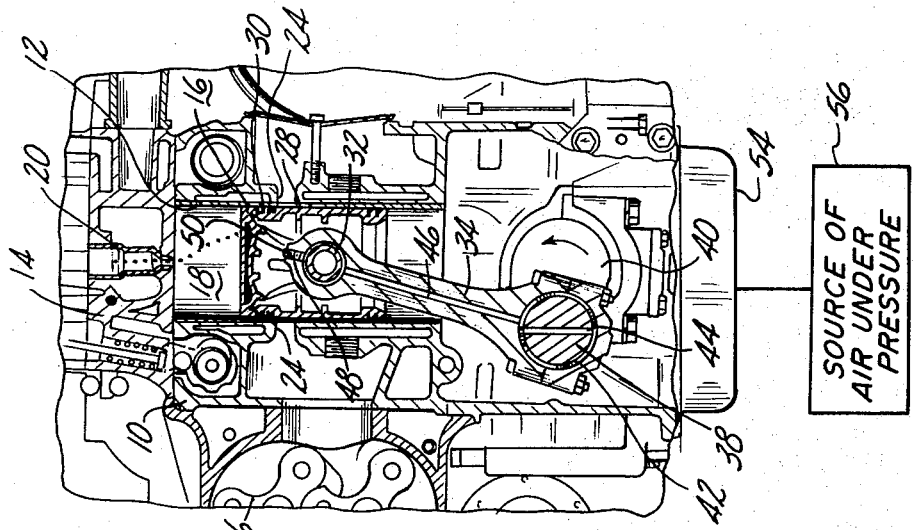
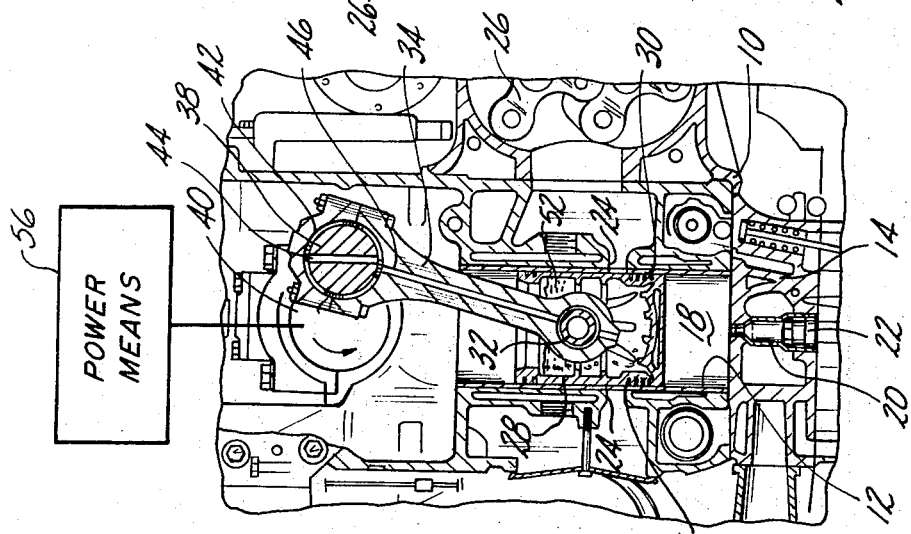
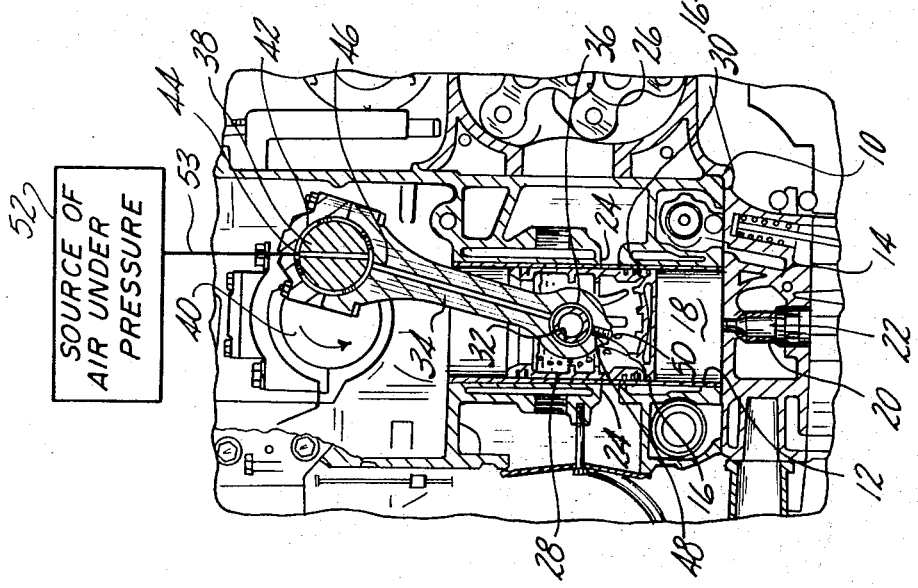

BUBBLE TEST FOR INTERNAL COMBUSTION ENGINES

BACKGROUND OF THE INVENTION

This invention relates to methods for diagnosing manufacturing defects and the like in internal combustion engines, and in particular for locating defects in pistons, connecting rods, crankshafts and oil galleries.

Internal combustion engines are conventionally assembled and then operated on a test stand to determine the existence of manufacturing defects. Such defects may include plugged oil passages and pistons having sand holes, cracks and porous areas, that are difficult to visually observe. Often the operating symptoms are such that the repair operator has an idea as to the nature of the defect but is unable to pinpoint the defect's location. For example, a smoking engine may indicate a piston having a sand hole. If the engine has eight pistons, the conventional approach is to disassemble the engine, visually observing each piston until the faulty one is located. The result is that several satisfactory components of the engine may be stripped and a considerable amount of time utilized in replacing piston rings, gaskets and seals. Occasionally the procedure has to be repeated when the defect cannot be visually located even though the entire engine has been disassembled.

SUMMARY OF THE INVENTION

The broad purpose of the present invention is to provide a method for locating defective pistons and blocked oil passages in internal combustion engines without disassembling satisfactory engine components. A quantity of a liquid is disposed in the engine in the piston being tested. Compressed air is then employed such that the presence or absence of a defect is determined by air bubbles in the liquid depending upon which technique is being employed.

One advantage of such a method is a considerable saving in time over the conventional procedure of disassembling an engine to pinpoint the defect. Another advantage is that the bubbles often show a defective piston having a sand hole that cannot be located by visual observation. In addition, a considerable saving results in gaskets, piston rings and other materials and labor, necessary whenever certain components of the engine are disassembled.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which:

FIG. 1 is a cross sectional view of a conventional diesel engine mounted in an upside down position for a bubble test illustrating a preferred form of the invention, a portion of the test apparatus being illustrated schematically;

FIG. 2 is a view of the engine of FIG. 1, but with the means for conducting another bubble test being illustrated schematically; and FIG. 3 is a view of the engine of FIG. 1 in a conventional position, and illustrating schematically the means for applying air pressure to the bottom side of the piston in another form of the bubble test.

DESCRIPTION OF THE PREFERRED EMBODIMENTS

The preferred testing methods are described with respect to a conventional diesel engine illustrated in FIGS. 1–3. The diesel engine includes a block 10. A substantially cylindrical cylinder liner 12 is mounted in block 10. A head 14 is mounted on block 10 to close off one end of liner 12. A piston 16 is mounted in liner 12 to form a combustion chamber 18. A tubular housing 20 is mounted in the head for mounting fuel injector means 22. Fuel injector means 22 is adapted to be connected to a source of fuel (not shown) for introducing combustible fuel into combustion chamber 18. Liner 12 has a plurality of ports 24 for receiving air delivered by blower means 26 to combustion chamber 18 to form a combustible mixture. Combustion takes place in response to compression of the combustion chamber contents by the piston 16 in a manner well known to those skilled in the art.

Piston 16 has a cylindrical skirt 28 and rings 30 slidably engaged with liner 12. A piston pin 32 is carried within piston 16.

An elongated connecting rod 34 has one end journaled on piston pin 32 by means of a bushing 36. The opposite end of connecting rod 34 is mounted on journal 38 of crankshaft 40 by means of a bearing 42. The arrangement is such that as crankshaft 40 is rotated, connecting rod 34 moves piston 16 in a reciprocating motion.

It is to be noted that the engine normally has a plurality of piston assemblies, and that the illustrated assembly is typical. Block 10 has an oil gallery (not shown) for receiving lubricating oil under pressure which is then distributed by drilled passages in crankshaft 40 to a passage 44 in each journal 38. Passage 44 is fluidly connected to a longitudinal oil passage 46 in the connecting rod that extends from journal 38 to piston pin 32. Passage 46 is fluidly connected around pin 32 to a short passage 48 at the outer end of the connecting rod. A spray nozzle 50 is mounted on the outer end of passage 48.

Referring to FIG. 1, block 10 is disposed in an upside down position, such that the open end of piston 28 is disposed to receive a liquid. Liquid, preferably an oil, is poured into the piston to a level above spray nozzle 50. A source of air under pressure 52 is connected to passage 44, as by an appropriate connection to the engine oil gallery 53 such that pressurized air is introduced to passages 46 and 48.

Assuming there is no blockage in any of the oil passages, the air will bubble out nozzle 50 and up through liquid 52. By observing the bubbles, the user can determine that the passages are unblocked. If there is a blockage in any of the passages or if any of the passages should be only partially drilled, the user can observe the absence of the bubbles to pinpoint the location of the blocked oil passage.

By connecting the pressurized air to the oil gallery, the air can pass to all of the engine's connecting rods. The user can then determine at a glance if passages are blocked in any of the connecting rods, and if so, can readily tell which connecting rod must be further inspected.

Referring to FIG. 2, and with engine block 10 in the upside down position, the user can then determine if there is a defect in the piston 16 by connecting an appropriate power means 56 to crankshaft 40 to rotate the crankshaft. As the crankshaft is rotated, piston 16 is moved in a compression stroke to compress the air in combustion chamber 18. If there is a crack, sand hole or other defect forming an opening in the piston, air from the combustion chamber will bubble up through liquid 52. The absence of such bubbles indicates that piston 16 is satisfactory.

Referring to FIG. 3, the engine is mounted in its upright, normal position. In this position piston 16 is below combustion chamber 18. This test can also be conducted in the field where the user may not have the means for rotating the engine to an upside down position. Fuel injector means 22 is removed from housing 20. A liquid, such as oil, is poured into combustion chamber 18 to fill it such that the oil level is in housing 20 with the piston on top dead center in a two cycle engine, or compression stroke on a four cycle engine. The bottom side of the block is closed off by the engine's oil pan 54 and a source of air under pressure 56 is connected through an appropriate opening, as for example, through the dip stick opening (not shown), into block 10. If there is a defect in the piston, such as a sand hole, the pressurized air will cause bubbles to pass upwardly through the liquid in the combustion chamber and out through the fuel injector housing where they can be observed by the user. The presence of such bubbles indicates a defective piston and the absence of such bubbles indicates a satisfactory piston.

Thus it is to be understood that I have described a series of tests that can be conducted on piston operated engines to locate either a defective piston or blocked oil passages without having to disassemble non-defective engine components. The preferred test procedure saves time over conventional methods, as well as materials, and is especially advantageous for locating microscopic defects that cannot normally be detected by visual observation.

Having described my invention, I claim:

1. A method for testing an internal combustion engine having an air filled combustion chamber and movably mounted, hollow piston forming a wall of said chamber, the piston having an opening, said method comprising the steps of:

disposing the engine such that the piston is suited for containing a liquid therein and introducing a liquid into the piston adjacent the piston opening; and moving the piston to compress air in the combustion chamber such that the air passes through the piston opening to bubble through the liquid in the piston whereby the presence of the bubbles indicates the existence of the opening and thereby a defective piston.

2. A method as defined in claim 1, including a crankshaft connected to the piston to move it in a reciprocating motion as the crankshaft is being rotated, and wherein the air in the combustion chamber is compressed in response to rotation of the crankshaft.

3. A method for testing an internal combustion engine having a movable, hollow piston; an elongated connecting rod having one end connected to the piston, an opening disposed in the piston, and a longitudinal passage suited for passing lubricating oil through said opening, said method comprising the steps of:

disposing the engine such that the piston is suited for containing a liquid therein and introducing a liquid into the piston to a level above the connecting rod opening, and connecting a source of air under pressure to the lubricating oil passage;

whereby either the air passes through said connecting rod opening and bubbles through the liquid contained in the piston to indicate a clear passage through the lubricating oil passage, or the absence of bubbles through the liquid indicates a blocked oil passage.

4. A method as defined in claim 3, in which the engine has an oil gallery connected to the lubricating oil passage, and the source of air pressure is connected to the oil gallery.

5. A method for testing an internal combustion engine having a combustion chamber, a piston reciprocally mounted to form a wall in said chamber, and an opening suited for mounting a fuel injector for introducing fuel into the combustion chamber, the piston having an opening suited for passing air, said method comprising the steps of:

filling the combustion chamber with a liquid;

connecting a source of air under pressure on the opposite side of the piston as the combustion chamber to pass air through the piston opening to form bubbles in said liquid;

observing the bubbles passing from the combustion chamber through the fuel injector opening, whereby the presence of the bubbles indicates the existence of the opening and thereby a defective piston.

* * * * *